(12) United States Patent
Huang et al.

(10) Patent No.: US 10,007,049 B2
(45) Date of Patent: Jun. 26, 2018

(54) QUANTUM ROD BACKLIGHT MODULE

(71) Applicant: BenQ Materials Corporation, Taoyuan (TW)

(72) Inventors: Ren-Hung Huang, Taoyuan (TW); Jian-Hung Wu, Taoyuan (TW); Shih-Wei Chao, Taoyuan (TW); Po-Tung Lai, Taoyuan (TW); Ya-Chun Chang, Taoyuan (TW); Yi-Lung Yang, Taoyuan (TW); Chung-Hung Chien, Taoyuan (TW); Meng-Chia Cheng, Taoyuan (TW); Chien-Yi Kao, Taoyuan (TW); Chen-Kuan Kuo, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 21 days.

(21) Appl. No.: 15/193,118

(22) Filed: Jun. 27, 2016

(65) Prior Publication Data

US 2017/0123139 A1 May 4, 2017

(30) Foreign Application Priority Data

Oct. 28, 2015 (TW) .............................. 104135463 A

(51) Int. Cl.
*G02B 6/34* (2006.01)
*F21V 8/00* (2006.01)

(52) U.S. Cl.
CPC .......... *G02B 6/0053* (2013.01); *G02B 6/005* (2013.01); *G02B 6/0046* (2013.01)

(58) Field of Classification Search
CPC .............................. G02B 6/0046; G02B 6/0053

USPC ................................ 349/64, 69; 362/84, 611
See application file for complete search history.

(56) References Cited

U.S. PATENT DOCUMENTS

| 2006/0227546 | A1 | 10/2006 | Yeo et al. | |
|---|---|---|---|---|
| 2012/0162576 | A1* | 6/2012 | Sakamoto | G02B 6/0016 349/65 |
| 2014/0362556 | A1* | 12/2014 | Cho | B32B 3/30 362/19 |

(Continued)

FOREIGN PATENT DOCUMENTS

| CN | 103201674 A | 7/2013 |
|---|---|---|
| CN | 104360425 A | 2/2015 |

(Continued)

*Primary Examiner* — Elmito Breval
*Assistant Examiner* — Keith Delahoussaye
(74) *Attorney, Agent, or Firm* — CKC & Partners Co., Ltd.

(57) ABSTRACT

Disclosed herein is a quantum rod backlight module for a liquid crystal display. The quantum rod backlight module includes a quantum rod layer disposing at one side of a backlight source and comprising a plurality of quantum rods, wherein the major axes of the plurality of quantum rods are aligned along a direction parallel to a surface of the quantum rod layer; a first micro-prism layer including a plurality of first parallel strip-shape prisms, and a second micro-prism layer including a plurality of second parallel strip-shape prisms, wherein both of the alignment directions of the first parallel strip-shape prisms and the second parallel strip-shape prisms are perpendicular to the direction of the major axes of the plurality of quantum rods, and the retardations of the first micro-prism layer and the second micro-prism layer are zero.

8 Claims, 4 Drawing Sheets

(56) References Cited

U.S. PATENT DOCUMENTS

2016/0334078 A1* 11/2016 Wang ........................ G02B 1/18
2017/0108726 A1* 4/2017 Yanai .................. G02F 1/13362

FOREIGN PATENT DOCUMENTS

| JP | 2009047802 A | 3/2009 |
| TW | 201213980 A | 4/2012 |
| TW | 201348813 A | 12/2013 |

* cited by examiner

QUANTUM ROD BACKLIGHT MODULE

RELATED APPLICATIONS

This application claims priority to Taiwanese Application Serial Number 104135463, filed on Oct. 28, 2015, which is herein incorporated by reference.

BACKGROUND

Field of Invention

This invention generally relates to a quantum rod backlight module used in liquid crystal display for enhancing the gamut and light utilization of the liquid crystal display.

Description of Related Art

Polarizers commonly used in the liquid crystal display are absorptive polarizers. In the liquid crystal display, when the non-polarized light emitted from the backlight is incident onto the absorptive polarizers, a component of the incident light parallel to the absorption axis direction of the polarizers is absorbed and cannot pass through the absorptive polarizers. Therefore, after the light emitted from backlight passing through the absorptive polarizer, the light will lose at least 50% in theoretically. In addition, after the light further passing through a polarizer, an electrode layer, a color filter, a liquid crystal module and a glass substrate, only less than 10% of the light, which originally emitted from backlight, can be transmitted to the observer. Accordingly, the light utilization of the backlight is quite low and causing waste of energy.

Several approaches to enhance the light utilization of the backlight have been proposed. For example, reflective brightness enhancement film (e.g., Dual Brightness Enhancement Film, DBEF), prism sheet and other optical film may be used in backlight module for continuously reflecting and reuse the light, which is unable to be transmitted by the polarizer, in order to redirected the light and let it pass the polarizers to enhance the brightness of the backlight module. In another example, concentrating the light of large viewing angle area of the liquid crystal display can increase the luminance at viewing direction. However, those solutions may increase the luminance of the backlight module; no significant effect is provided to the gamut and the color saturation of the liquid crystal display.

Therefore, a solution is proposed by using quantum dots in backlight module to increase the gamut thereof. The quantum dot is a semiconductor material of zero-dimensional structure, and it is able to absorb UV light or blue light having shorter wavelength and emit green light or red light having longer wavelength in order to mix to white light source. Because the spectrum of the excitation light of the quantum dot is with a narrower full-width-at-half-maximum (FWHM), the gamut of the liquid crystal display using the quantum dots will be more than 100% NTSC.

In addition, another approach is proposed that a quantum rod layer is integrated into the backlight module. The quantum rod is a nano-scale semiconductor material and the shape belongs to one-dimensional structure. The quantum rod is different from the absorptive polarizer, which absorbs non-polarizing light with evolution of heat. The quantum rod is able to absorb the non-polarized light to emit a polarized light with a wavelength longer than the original non-polarized light from the major axis direction thereof. Because of the high internal quantum efficiency, most of the incident light from the backlight source can be transformed to polarized light. The quantum rods are aligned in the direction of major axis, and the emitted polarized light is efficiently passed through the transmission axis of the polarizer disposed on the liquid crystal display. Accordingly, compared to the backlight module with quantum dots, the light utilization of a backlight module with the quantum rods will further be enhanced.

Usually, the dichroic ratio (DR) is used to evaluate the efficiency of transformed polarizing light emitted by quantum rod layer. The dichroic ratio is obtained by an equation $DR=Y_{//}/Y_{\perp}$, wherein the $Y_{//}$ is the transmittance obtained as the major axis of the quantum rod layer is parallel to the transmission axis of the detection polarizer; $Y_{\perp}$ is the transmittance obtained as the major axis of the quantum rod layer is perpendicular to the transmission axis of the detection polarizer. When a backlight source is not transmitted through a quantum rod layer, the $Y_{//}$ and $Y_{\perp}$ are almost the same and thus the dichroic ratio is about 1, since there is no directionality of the general light. As the dichroic ratio is higher, the dichroism of the quantum rod layer is significant. When a light is transmitted through a quantum rod layer with a higher dichroism, the light will be transformed into a light with a better polarization and directionality. As using quantum rod layer in the stacked optical films of the current backlight module, the light reflection and the light refraction in the optical films, the retardations of the optical films or the light be scattered by the particles composed in films, decrease the dichroic ratio of the light excited by the quantum rod layer passing through these optical films. Thus, when the light generated from the backlight module with a quantum rod layer passes through the polarizers of the liquid crystal display, the brightness of the display is not as expected.

In addition, referring to FIG. 1, it shows the arrangement of a conventional backlight module. In a conventional backlight module, a set of a first micro-prism layer 11 and a second micro-prism layer 12 is included, wherein a plurality of first parallel strip-shape prisms 11a of the first micro-prism layer 11 and a plurality of second parallel strip-shape prisms 12a of the second micro-prism layer 12 are perpendicularly arranged for directing light at side-viewing angle to the forward viewing angle to increase the brightness thereof. However, when a quantum rod layer 13 is directly disposed in the arrangement of the conventional backlight module 1, i.e., the quantum rod layer 13 is disposed between the backlight source 14 and the first micro-prism layer 11, the dichroism of the quantum rod layer 13 declines because the difference of the retardation of the materials of the first micro-prism layer 11 and the second micro-prism layer 12 and the perpendicularly arrangement offset the polarization of the polarized light generated by the quantum rods 13a of the quantum rod layer 13. Thus, although the polarized light generated by the quantum rod layer 13 passes through the first micro-prism layer 11 and the second micro-prism layer 12 to be directed to increase the brightness at viewing angle, the polarized light is unable to maintain the direction of the polarizing axis to be consistent to the direction of the transmission axis of the polarizer disposed on the liquid crystal cell when subsequently passing through the polarizer. Thus, the polarization effect generated by the quantum rod layer 13 is unable to be utilized properly.

SUMMARY OF INVENTION

According to one broad aspect of the invention, there is provided a novel, inventive and useful quantum rod backlight module.

The present invention is to provide a quantum rod backlight module. In an embodiment of the present invention, the quantum rod backlight module includes a backlight source; a quantum rod layer disposing at one side of the backlight source and comprising a plurality of quantum rods, wherein the major axes of the quantum rods are aligned along a direction parallel to a surface of the quantum rod layer; a first micro-prism layer including a plurality of first parallel strip-shape prisms and disposing at the light exit side of the quantum rod layer, and a second micro-prism layer including a plurality of second parallel strip-shape prisms and disposing on a side of the first micro-prism layer; wherein both of the alignment directions of the first parallel strip-shape prisms of the first micro-prism layer and the second parallel strip-shape prisms of the second micro-prism layer are perpendicular to the direction of the major axes of the plurality of quantum rods, and the retardations of the first micro-prism layer and the second micro-prism layer are zero.

In an embodiment of the quantum rod backlight module of the present invention, the refractive index of the first micro-prism layer and the second micro-prism layer is between 1.4 and 1.7.

In an embodiment of the quantum rod backlight module of the present invention, the prism angles of the first parallel strip-shape prisms of the first micro-prism layer and the second parallel strip-shape prisms of the second micro-prism layer are between 80° and 110°.

In an embodiment of the quantum rod backlight module of the present invention, the materials of the first micro-prism layer and the second micro-prism layer are independently selected from a group consisting of polymethyl methacrylate, polyethylene terephthalate, cellulose triacetate, polyethylene and a combination thereof.

In an embodiment of the quantum rod backlight module of the present invention, the lengths of the quantum rods are between about 10 nm and 50 nm; the aspect ratios of the quantum rods are between 5 and 10.

In an embodiment of the quantum rod backlight module of the present invention, the quantum rods include one or more quantum rods with different lengths.

In an embodiment of the quantum rod backlight module of the present invention, the quantum rods include one or more semiconductor materials, the material of the quantum rods is a semiconductor material selected from a group consisting of group III-V, group II-VI and group IV-VI compounds and a combination thereof.

In an embodiment of the quantum rod backlight module of the present invention, the quantum rod layer is encapsulated by a first barrier layer and a second barrier layer at each side of the quantum rod layer respectively.

In an embodiment of the quantum rod backlight module of the present invention, the material of the first barrier layer and the material of the second barrier layer are independently selected from a group consisting of polyethylene terephthalate, polymethyl methacrylate, epoxy polymer, polysiloxanes, fluororesin polymer, metal oxide-containing organic/inorganic composite and a combination thereof.

DETAILED DESCRIPTION

The invention can be more fully understood by reading the following detailed description of the embodiment, with reference made to the accompanying drawings that illustrate the invention and it should be noted that the drawings are not to scale and only for illustration only.

The quantum rod backlight module of the present invention will now be described in reference to the accompanying drawings. Similar numbers on the drawings refers to the same elements.

Figure 1:
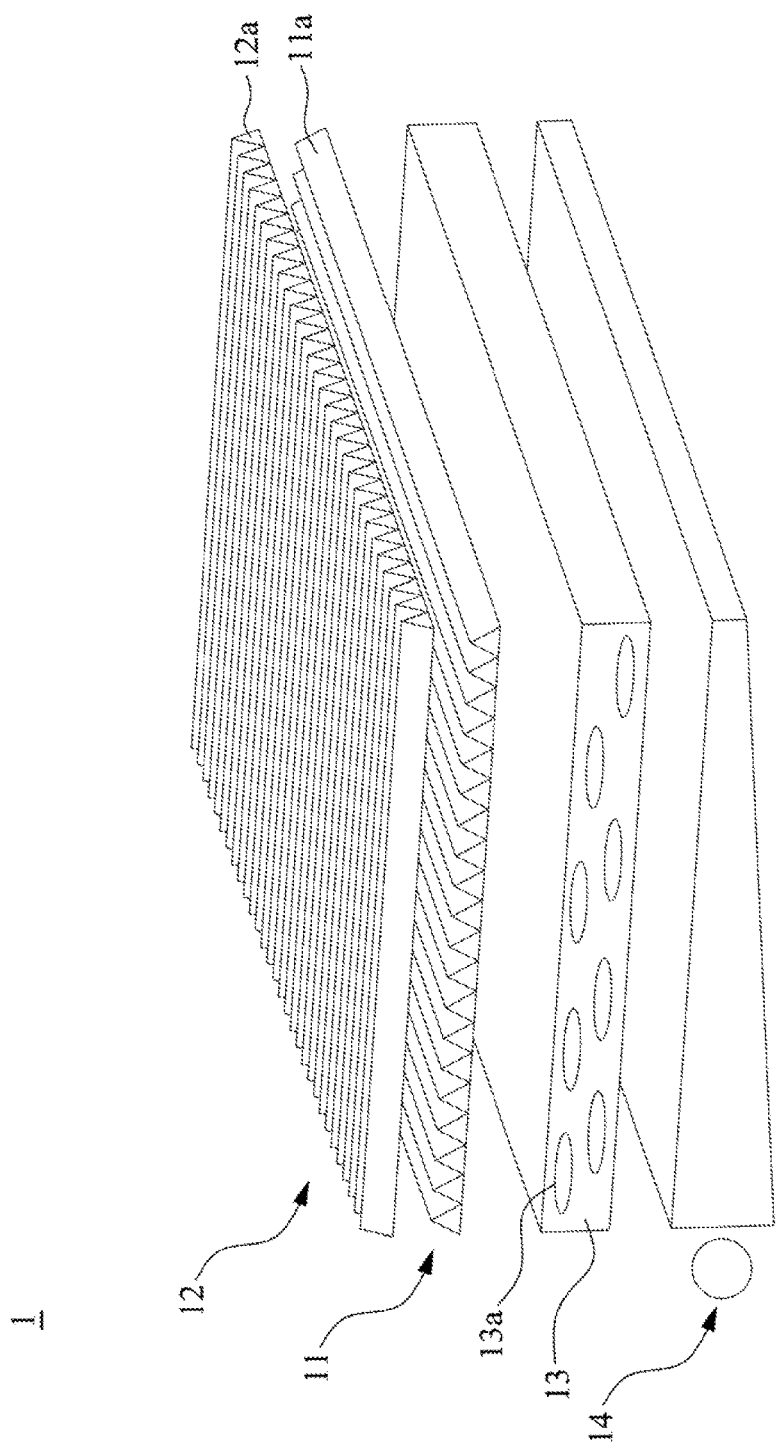
FIG. 1 is a perspective view of a quantum rod layer in prior art.
Figure 2:
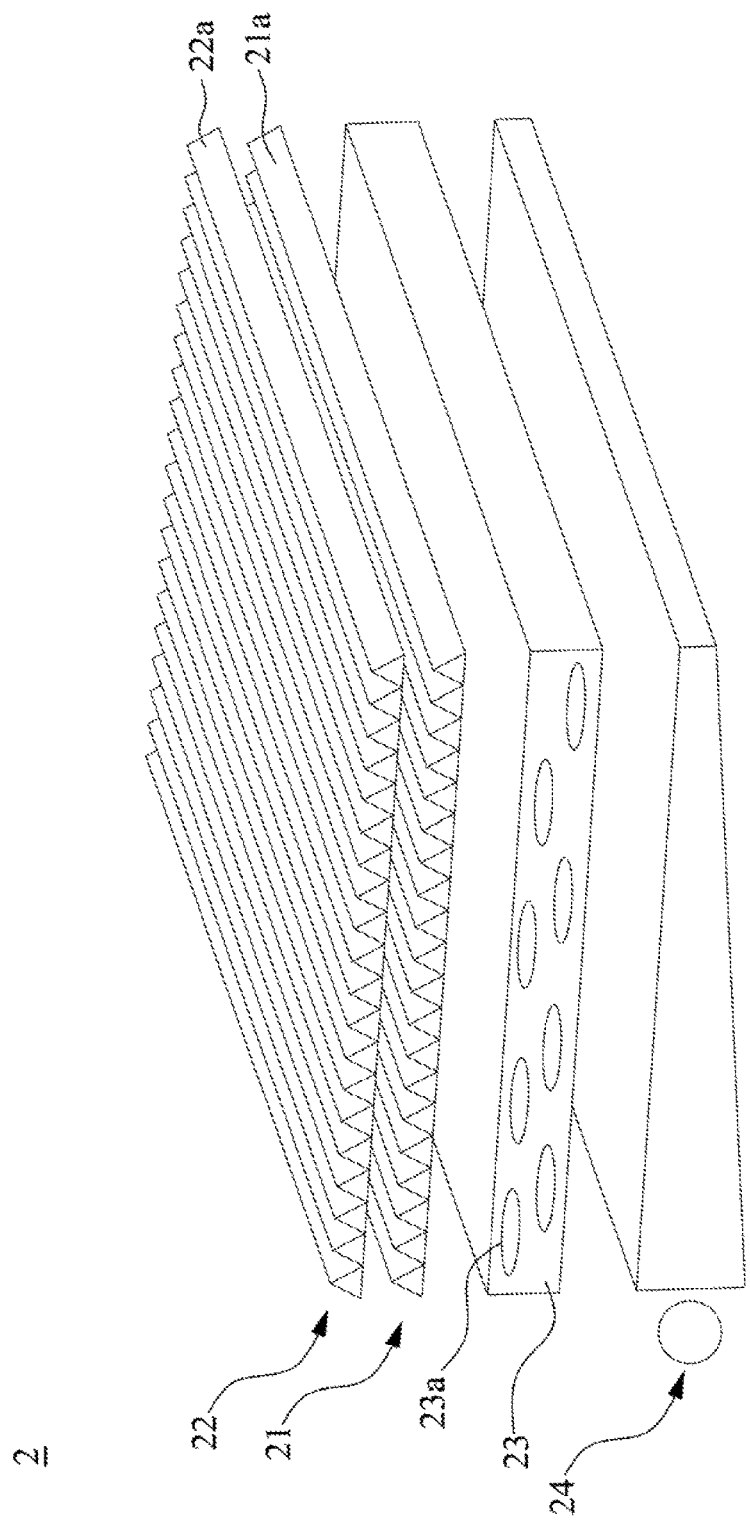
FIG. 2 is a perspective view of a quantum rod backlight module of an embodiment of the present invention.

Now referring to FIG. 2, it is a perspective view of a quantum rod backlight module 2 of an embodiment of the present invention. In an embodiment of the present invention, the quantum rod backlight module 2 comprises a backlight source 24; a quantum rod layer 23 disposing at one side of the backlight source 24 and comprising a plurality of quantum rods 23a, the major axes of the quantum rods 23a are aligned along a direction parallel to a surface of the quantum rod layer 23; a first micro-prism layer 21 including a plurality of first parallel strip-shape prisms 21a and disposing at a the light exit side of the quantum rod layer 23; and a second micro-prism layer 22 including a plurality of second parallel strip-shape prisms 22a and disposing on a side of the first micro-prism layer 21; wherein both of the alignment directions of the first parallel strip-shape prisms 21a of the first micro-prism layer 21 and the second parallel strip-shape prisms 22a of the second micro-prism layer are perpendicular to the direction of the major axes of the plurality of quantum rods 23a, and the retardations of the first micro-prism layer 21 and the second micro-prism layer 22 are zero. Accordingly, the polarized light generated by the quantum rod layer 23 will be unlikely to be deflected.

Figure 3A:
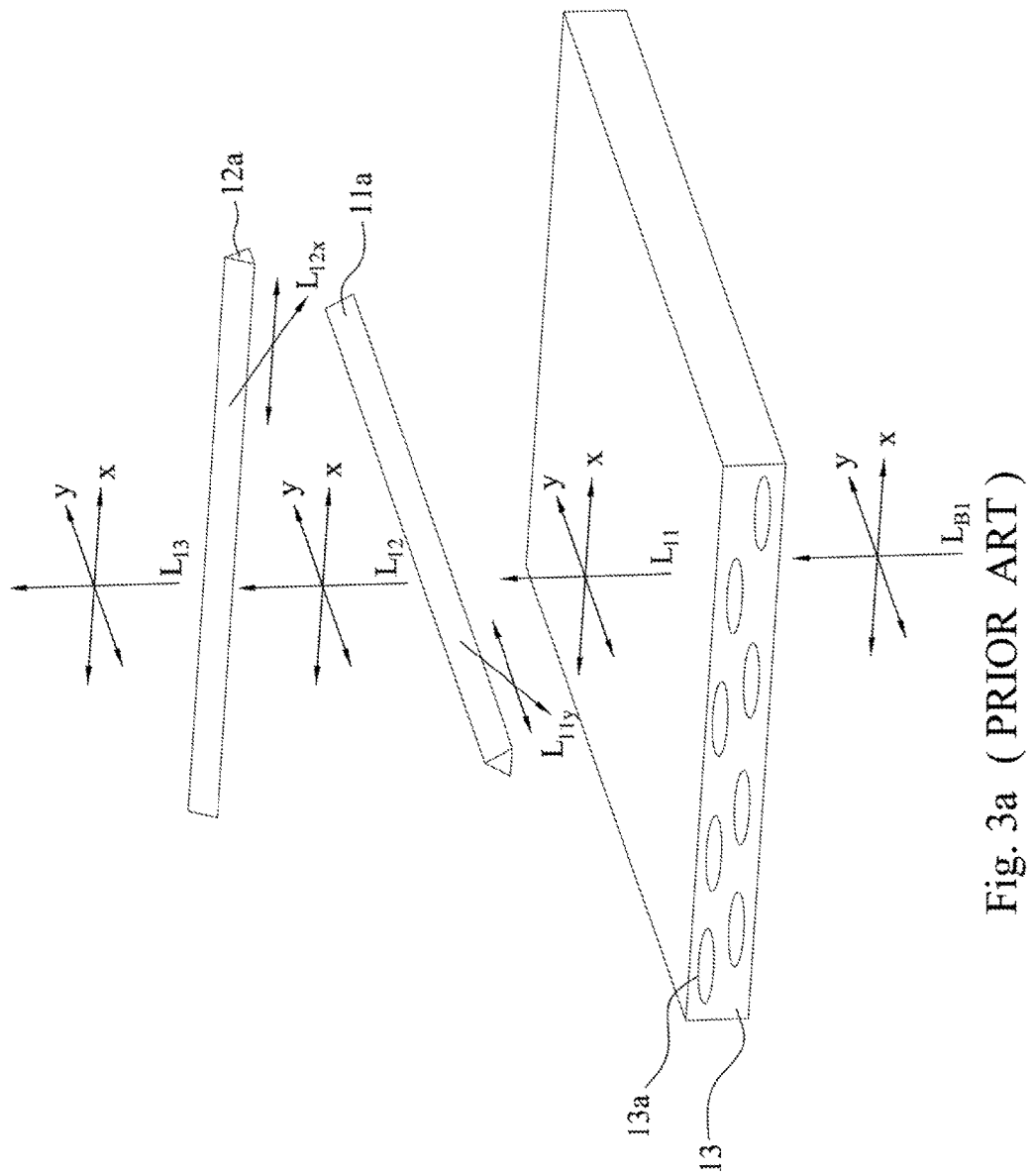
FIG. 3a is a perspective view showing the principle of a quantum rod layer in a backlight module generating polarized light of prior art.
Figure 3B:
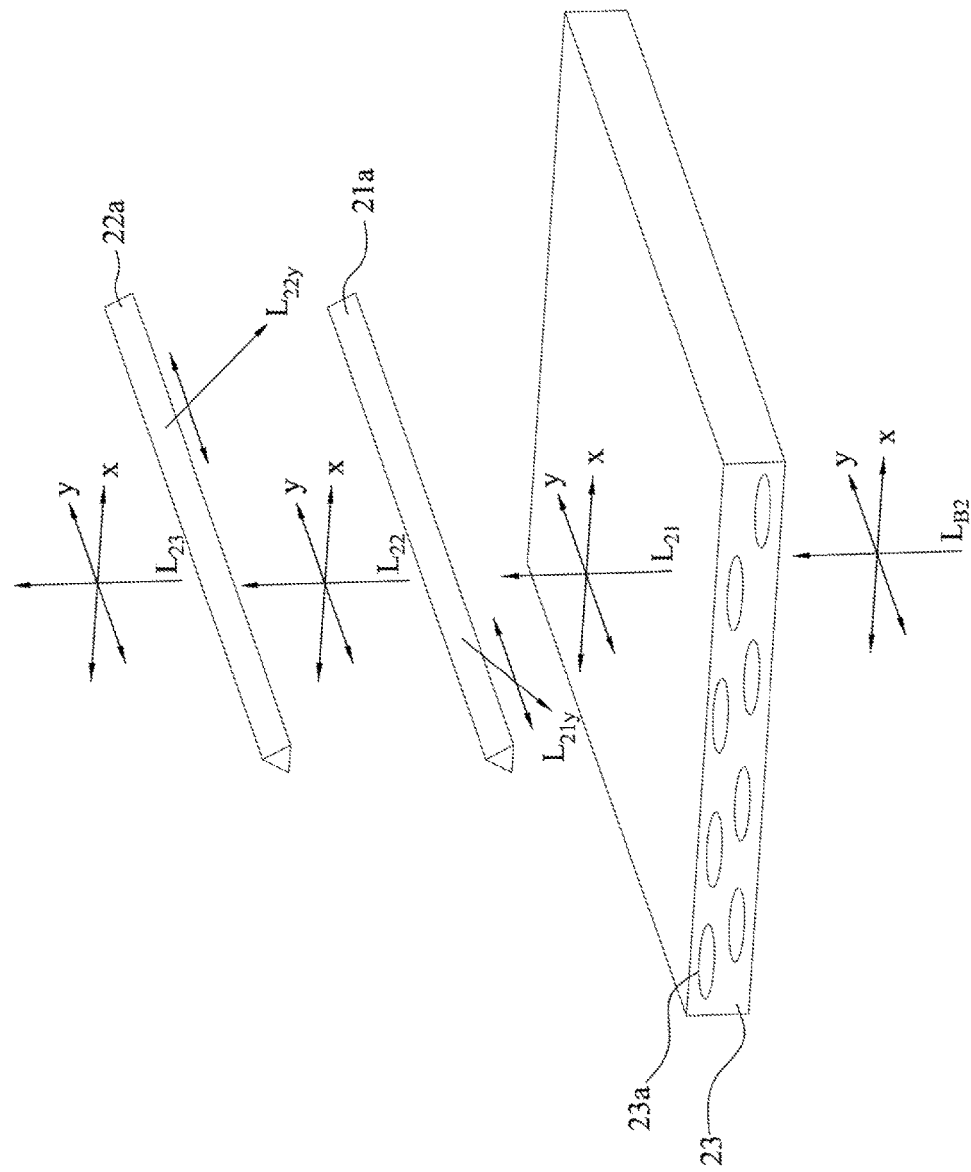
FIG. 3b is a perspective view showing the principle of the quantum rod backlight module generating polarized light of an embodiment of the present invention.

Referring to FIGS. 3a and 3b, the drawings respectively illustrate the perspective views of backlight modules with different arrangements of parallel strip-shape prisms, wherein the first parallel strip-shape prisms 11a is perpendicularly aligned with the second parallel strip-shape prisms 12a as the arrangement of a conventional backlight module, and the first parallel strip-shape prisms 21a is parallel aligned with the second parallel strip-shape prisms 22a as the arrangement of the present backlight module. In FIG. 3a, when the backlight source (not shown) emits a light with a short wavelength, such as a blue light ($L_{B1}$), and passes through the quantum rod layer 13 of the conventional backlight module, the light incident to the quantum rod layer 13 excites the quantum rod 13a in the direction of the major axis thereof to emit a light with longer wavelength in x-axis direction, such as red light or green light. Thus, the component of an emitted light ($L_{11}$) in x-axis direction emitted by the major axis of the quantum rod 13a is more than the component of the emitted light ($L_{11}$) in y-axis direction, and when the emitted light ($L_{11}$) is incident to a surface of the first parallel strip-shape prisms 11a at Brewster angle, the reflected light will generate a polarized reflected light ($L_{11y}$) with only a y-axis direction component and parallel to the first parallel strip-shape prisms 11a, and can be reflected to be reused. An emitted light ($L_{12}$) passing through the first parallel strip-shape prisms 11a maintains a partial x-axis direction component and a partial y-axis direction component, wherein the x-axis direction component parallel to the major axis direction of the quantum rods 13a is still greater than the y-axis direction component. However, because the first parallel strip-shape prisms 11a is perpendicular to the second parallel strip-shape prisms 12a, the emitted light ($L_{12}$) incident to a surface of the second parallel strip-shape prisms 12a at Brewster angle will generate a polarized reflected light ($L_{12x}$) with only a x-axis direction component parallel to the second parallel strip-shape prisms 12a. An x-axis direction component of an emitted light ($L_{13}$) in a direction of the major axis of the quantum rod 13a declines accordingly when the emitted light ($L_{12}$) passes through the second parallel strip-shape prisms 12a. The brightness enhancement effect is poor when the emitted light ($L_{13}$) passing through the polarizer of the liquid crystal panel, because the emitted light ($L_{13}$) cannot maintains the same polarization direction with the transmission axis of the polarizer. In FIG. 3b, when the backlight source (not shown) emits a blue light ($L_{B2}$), and passes through the quantum rod layer 23 of the present backlight module, the light incident to the quantum rod layer 23 excites the quantum rod 23a in the direction of the major axis thereof to emit a light with longer wavelength in x-axis direction. Thus, the component of a emitted light ($L_{21}$) in x-axis direction emitted by the major axis of the quantum rod 13a is more than that of the emitted light in y-axis direction, and when the emitted light ($L_{21}$) is incident to a surface of the first parallel strip-shape prisms 21a at Brewster angle, the reflected light will generate a polarized reflected light ($L_{21y}$) with only a y-axis direction component and parallel to the first parallel strip-shape prisms 21a, and can be reflected to reuse. An emitted light ($L_{22}$) passing through the first parallel strip-shape prisms 21a maintains a partial x-axis direction component and a partial y-axis direction component, wherein the x-axis direction component parallel to the major axis direction of the quantum rods 23a is still greater than the y-axis direction component. Because the first parallel strip-shape prisms 21a is parallel to the second parallel strip-shape prisms 22a, the emitted light ($L_{22}$) incident to a surface of the second parallel strip-shape prisms 22a at Brewster angle will generate a polarized reflected light ($L_{22y}$) with only a y-axis direction component parallel to the second parallel strip-shape prisms 22a, and been recycled. A y-axis direction component of an emitted light ($L_{23}$) in a direction of the minor axis of the quantum rod 23a declines accordingly when the emitted light ($L_{22}$) passes through the second parallel strip-shape prisms 22a. The brightness enhancement effect is better when the emitted light ($L_{23}$) passes through the polarizer of the liquid crystal panel, because the emitted light ($L_{23}$) can maintain the same polarization direction with the transmission axis of the polarizer.

Please referring to Table 1, Table 1 is the test data of the quantum rod backlight module of the present invention as a example and the conventional backlight module as a comparative example. In the same condition of that the quantum rod layer contains green light quantum rods and red light quantum rods, and dichroic ratio of the quantum rod layer ($DR_{QR}$) is 5.48, a blue light passes through the comparative example including the quantum rod layer, the first micro-prism layer and the second micro-prism layers, wherein the first parallel strip-shape prisms of the first micro-prism layer and the second parallel strip-shape prisms of the second micro-prism layers are perpendicularly arranged, and obtains a total backlight brightness ($Y_{total}$) of 4820 nits. The blue light passes through the present quantum rod backlight module including the quantum rod layer, the first micro-prism layer and the second micro-prism layers, wherein the first parallel strip-shape prisms of the first micro-prism layer and the second parallel strip-shape prisms of the second micro-prism layers are parallel arranged, and obtains a total backlight brightness ($Y_{total}$) of 4722 nits. Because the dimension of the light concentration direction of the parallel arranged strip-shape prisms is one less than that of the perpendicularly arranged strip-shape prisms, the total backlight brightness of the present quantum rod backlight is a little less than that of the comparative example. However, to compare the difference of brightness when the blue light will actually pass through the liquid crystal panel, the backlight brightness (Y//) of the conventional backlight module in the direction parallel to the transmission axis of the polarizer is only 2855 nits, and the backlight brightness (Y⊥) of the conventional backlight module in the direction perpendicular to the transmission axis of the polarizer is 1344 nits, and the dichroic ratio ($DR_{total}$) of the conventional backlight module is reduced to 2.12 accordingly, so that the brightness enhancement effect and the polarization is poor. The backlight brightness (Y//) of the quantum rod backlight module of present invention in the direction parallel to the transmission axis of the polarizer is 3182 nits, and the backlight brightness (Y⊥) of the quantum rod backlight module of present invention in the direction perpendicular to the transmission axis of the polarizer is also reduced to 934 nits, and the dichroic ratio ($DR_{total}$) of the present invention is 3.41 accordingly, so that the brightness enhancement effect and the polarization is superior. From the test results of the dichroic ratio of different wavelength, the dichroic ratio of blue light ($DR_B$), the dichroic ratio of green light ($DR_G$) and the dichroic ratio of red light ($DR_R$) of the present backlight module are all more than those of the conventional backlight module, it is known that the parallel arranged strip-shape prisms have a less damage on the dichroic ratio of green light ($DR_G$) and the dichroic ratio of red light ($DR_R$) than those of the perpendicularly arranged strip-shape prisms. In addition, the reflected light of the blue light can be transformed to a polarized light with the same polarization direction with the transmission axis of the polarizer, so that it is also preferred to obtain a better dichroic ratio of blue light ($DR_B$) and to gain more polarized blue light.

TABLE 1

|  | $Y_{total}$ | $Y_{//}$ | $Y_⊥$ | $DR_{total}$ | $DR_B$ | $DR_G$ | $DR_R$ |
| --- | --- | --- | --- | --- | --- | --- | --- |
| Comparative Example | 4820 | 2855 | 1344 | 2.12 | 1.93 | 2.09 | 2.27 |
| Example | 4722 | 3182 | 934 | 3.41 | 2.89 | 3.31 | 3.83 |

In an embodiment of the quantum rod backlight module of the present invention, the refractive index of the first micro-prism layer and the second micro-prism layer is between 1.4 and 1.7.

In an embodiment of the quantum rod backlight module of the present invention, the prism angles of the first parallel strip-shape prisms of the first micro-prism layer and the second parallel strip-shape prisms of the second micro-prism layer are between 80° and 110° in order for the light to be incident into the micro-prism layer at Brewster angle.

In an embodiment of the quantum rod backlight module of the present invention, the materials of the first micro-prism layer and the second micro-prism layer are independently selected from a group consisting of polymethyl methacrylate, polyethylene terephthalate, cellulose triacetate and polyethylene, and a combination thereof.

In an embodiment of the quantum rod backlight module of the present invention, the lengths of the quantum rods are between about 10 nm and 50 nm; the aspect ratios of the quantum rods are between 5 and 10.

In an embodiment of the quantum rod backlight module of the present invention, the quantum rods include one or one more quantum rods with different size. By adjusting ratio of the content of quantum rods with different sizes in the quantum rod layer, the light from the quantum rod layer, which is mixed with the green light and the red light respectively emitted from the quantum rods with different sizes, together with the transmitted blue light from the light source will be adjusted to be the desired white light source for displays. In addition, because the excitation spectrum of the quantum rods material is with a narrow full-width-at-half-maximum (FWHM), the gamut area of the display using the present polarizer will be larger.

In an embodiment of the quantum rod backlight module of the present invention, the quantum rods include one or more semiconductor materials, the material of the quantum rods is a semiconductor material selected from a group consisting of group III-V, group II-VI and group IV-VI compounds and a combination thereof. The semiconductor materials is but not limited to, for example, such as AlN, AlP, AlAs, AlSb, GaN, GaP, GaAs, GaSb, InN, InP, InSb, ZnO, ZnS, ZnSe, ZnTe, CdS, CdSe, CdTe, HgSe, HgTe, PbS, PbSe, PbTe.

In an embodiment of the quantum rod backlight module of the present invention, the quantum rod layer is encapsulated by a first barrier layer and a second barrier layer at the each side of the quantum rod layer respectively in order to provide a good encapsulation structure for barring the moisture and oxygen to enhance the weatherability and durability of the quantum rod layer.

In an embodiment of the quantum rod backlight module of the present invention, a material of the first barrier layer and a material of the second barrier layer are independently selected from a group consisting of polyethylene terephthalate, polymethyl methacrylate, epoxy polymer, polysiloxanes, fluororesin polymer and metal oxide-containing organic/inorganic composite.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A quantum rod backlight module including:
a backlight source;
a quantum rod layer disposing at one side of the backlight source and comprising a plurality of quantum rods, wherein the major axes of the quantum rods are aligned along a direction parallel to a surface of the quantum rod layer;
a first micro-prism layer including a plurality of first parallel strip-shape prisms and disposing at a light exit side of the quantum rod layer, wherein the first parallel strip-shape prisms has a cross sectional shape that defines valleys between adjacent ones of the first parallel strip-shape prisms, and the valleys are exposed; and
a second micro-prism layer including a plurality of second parallel strip-shape prisms and disposing on the first micro-prism layer,
wherein both of the alignment directions of the first parallel strip-shape prisms of the first micro-prism layer and the second parallel strip-shape prisms of the second micro-prism layer are perpendicular to the direction of the major axes of the plurality of quantum rods, and the retardations of the first micro-prism layer and the second micro-prism layer are zero, and
wherein the refractive index of the first micro-prism layer and the second layer is between 1.4 and 1.7.

2. The quantum rod backlight module of claim 1, wherein the prism angles of the first parallel strip-shape prisms of the first micro-prism layer and the second parallel strip-shape prisms of the second micro-prism layer are between 80° and 110°.

3. The quantum rod backlight module of claim 1, wherein the materials of the first micro-prism layer and the second micro-prism layer are independently selected from a group consisting of polymethyl methacrylate, polyethylene terephthalate, cellulose triacetate, polyethylene and a combination thereof.

4. The quantum rod backlight module of claim 1, wherein the lengths of the quantum rods are between about 10 nm and 50 nm; the aspect ratios of the quantum rods are between 5 and 10.

5. The quantum rod backlight module of claim 1, wherein the quantum rods include one or more quantum rods with different lengths.

6. The quantum rod backlight module of claim 1, wherein the quantum rods include one or more semiconductor materials, the material of the quantum rods is a semiconductor material selected from a group consisting of group III-V, group II-VI and group IV-VI compounds and a combination thereof.

7. The quantum rod backlight module of claim 1, wherein the quantum rod layer is encapsulated by a first barrier layer and a second barrier layer at the each side of the quantum rod layer respectively.

8. The quantum rod backlight module of claim 7, wherein a material of the first barrier layer and a material of the second barrier layer are independently selected from a group consisting of polyethylene terephthalate, polymethyl methacrylate, epoxy polymer, polysiloxanes, fluororesin polymer, and metal oxide-containing organic/inorganic composite and a combination thereof.

* * * * *